United States Patent [19]

Yoon

[11] Patent Number: 5,696,583

[45] Date of Patent: Dec. 9, 1997

[54] APPARATUS FOR AUTOMATICALLY MEASURING THE THICKNESS OF A TRANSPARENT COATING MATERIAL USING A WHITE LIGHT SOURCE

[75] Inventor: Hee-Sung Yoon, Seoul, Rep. of Korea

[73] Assignee: Daewoo Electronics, Co., Ltd., Seoul, Rep. of Korea

[21] Appl. No.: 524,921

[22] Filed: Sep. 8, 1995

[30] Foreign Application Priority Data

Nov. 16, 1994 [KR] Rep. of Korea .............. 94-29981

[51] Int. Cl.$^6$ ........................... G01B 9/02
[52] U.S. Cl. ........................... 356/355; 356/381
[58] Field of Search ........................... 356/355, 357, 356/381

[56] References Cited

U.S. PATENT DOCUMENTS 4,293,224  10/1981  Gaston et al. .............. 356/357
4,641,971   2/1987  Korth ....................... 356/357
4,660,979   4/1987  Muething ................... 356/357

FOREIGN PATENT DOCUMENTS 0122906   5/1988  Japan ....................... 256/355

Primary Examiner—Samuel A. Turner
Attorney, Agent, or Firm—Pennie & Edmonds, LLP

[57] ABSTRACT

An apparatus for measuring a thickness of a coating formed on a surface of a component member includes a white light source for emitting a light beam to be reflected by the surface of the member, one or more filters, each of the filters capable of filtering the reflected light beam in a selected wavelength range, an identical number of photo-detection sections as filters, each of the photo-detection sections being used for converting the intensity of the filtered light beam into a counting reference signal having a logic high and low states, a counter for counting the logic high states to generate a count number and a signal processor for computing the coating thickness based on the count number. Each of the photo-detection sections has a photo-detector, an ampere-to-voltage convertor, a peak voltage value detector and a comparator.

8 Claims, 5 Drawing Sheets 3,696,583

APPARATUS FOR AUTOMATICALLY MEASURING THE THICKNESS OF A TRANSPARENT COATING MATERIAL USING A WHITE LIGHT SOURCE

FIELD OF THE INVENTION

The present invention relates to an apparatus for measuring the coating thickness; and, more particularly, to an apparatus capable of measuring the thickness of a transparent material during the growth thereof.

DESCRIPTION OF THE PRIOR ART

As is well known, protective coatings have been extensively used by the mechanical, electronic, and aerospace industries to impart erosion, abrasion, corrosion, and oxidation resistance characteristics to various articles and components and increase their useful life time. Several techniques such as plasma enhanced chemical vapor deposition (PECVD), physical vapor deposition(PVD), electroplating have been developed and used for forming the coatings on the targeted articles or surfaces. The imparted properties are known to vary greatly with the thickness of the coating and are known to provide an optimal result when the thickness of the coating is held within a certain limit. Hence, in order to obtain the optimal result from the coating, it becomes necessary to monitor precisely the coating thickness while the coating is being formed, i.e., in situ.

In FIG. 1, there is shown an apparatus for measuring the coating thickness in situ, as disclosed in U.S. Pat. No. 5,208,645, entitled "Method and Apparatus for Optically Measuring the Thickness of a Coating". The apparatus comprises a light source 10, a first and a second lenses 11, 12, a specimen in a cylindrical shape having a side surface 24, the side surface being coated with a transparent material, a third lens 13, a detector 15, an amplifier 16 and a voltmeter 17. In the apparatus, a light beam emitted by the light source 10, such as a He-Ne laser, is expanded by the first and the second lenses 11, 12. The expanded light beam Pi is then admitted onto the side surface 24 of the specimen, and is reflected therefrom. The reflected light beam Pr from the coated side surface is focused onto the detector 15, e.g., a Si photo-diode, by means of the third lens 13. The detector 15 detects the intensity of the reflected light beam Pr which varies as a function of the thickness. The intensity detected by the detector 15 first amplified by the amplifier 16 and then inputted into the voltmeter 17 which converts the amplified intensity into a corresponding voltage. The coating thickness is then obtained by comparing the voltage variation with a predetermined calibration curve representing the correlation between the light intensity reflected from the coated side surface and the coating thickness.

There is a number of problems associated with the above-described apparatus, however. First of all, the light source and the photo-diode must be optically aligned precisely in order to obtain meaningful results, which is rather difficult to achieve.

Another problem present in the prior art apparatus is that it requires a light source capable of providing a coherent and monochromatic light beam, e.g., He-Ne laser, and such a light source is usually expensive.

SUMMARY OF THE INVENTION

It is, therefore, a primary object of the present invention to provide an apparatus for measuring a coating thickness in situ, which is easy to operate and dispenses with the use of an expensive monochromatic light source.

In accordance with the present invention, there is provided an apparatus for measuring, in situ, a thickness of a transparent coating material coated on a surface of an article with a coating surface thereof, the apparatus comprising:

a white light source for emitting a light beam onto the surface of the article, wherein the light beam is partially reflected, generating a first reflected light beam, and partially transmitted at the coating surface of the transparent coating material, the transmitted part being subsequently reflected back to the coating surface by the surface of the article, generating a second reflected light beam, wherein the first and the second reflected light beams interfere with each other due to a phase difference therebetween to thereby produce an interfered reflected light beam;

one or more filters, each of the filters capable of filtering the interfered reflected light beam in a selected wavelength range to thereby produce a filtered light beam having the selected wavelength range;

an identical number of photo-detection sections as the filters arranged in parallel, each of the photo-detection sections capable of detecting an intensity of the filtered light beam from a corresponding filter and generating a counting reference signal therefrom, wherein each of the photo-detection sections includes:

a photo-detector for detecting the intensity of the filtered light beam from a corresponding filter and converting it into a corresponding current signal, wherein the current signal exhibits a multiplicity of current peaks;

an ampere-to-voltage convertor capable of converting the current signal from the photo-detector into a corresponding voltage signal, the voltage signal exhibiting a multiplicity of voltage peaks, each of the voltage peaks having an associated peak value and corresponding to each of the current peaks;

a peak voltage value detector for detecting the peak voltage values in the voltage signal from the ampere-to-voltage convertor; and a comparator for comparing the peak voltage values with a predetermined threshold value, respectively, to thereby produce the counting reference signal having logic high and low states;

a counter for counting the logic high states of the counting reference signal to thereby produce a count number; and a signal processor for selecting the coating thickness from a plurality of predetermined coating thicknesses based on the count number.

BRIEF DESCRIPTION OF THE DRAWINGS

The present invention together with the above and other objects and advantages will become apparent from the following description of the preferred embodiments given in conjunction with the accompanying drawings, wherein.

DETAILED DESCRIPTION OF THE PREFERRED EMBODIMENTS

Figure 1:
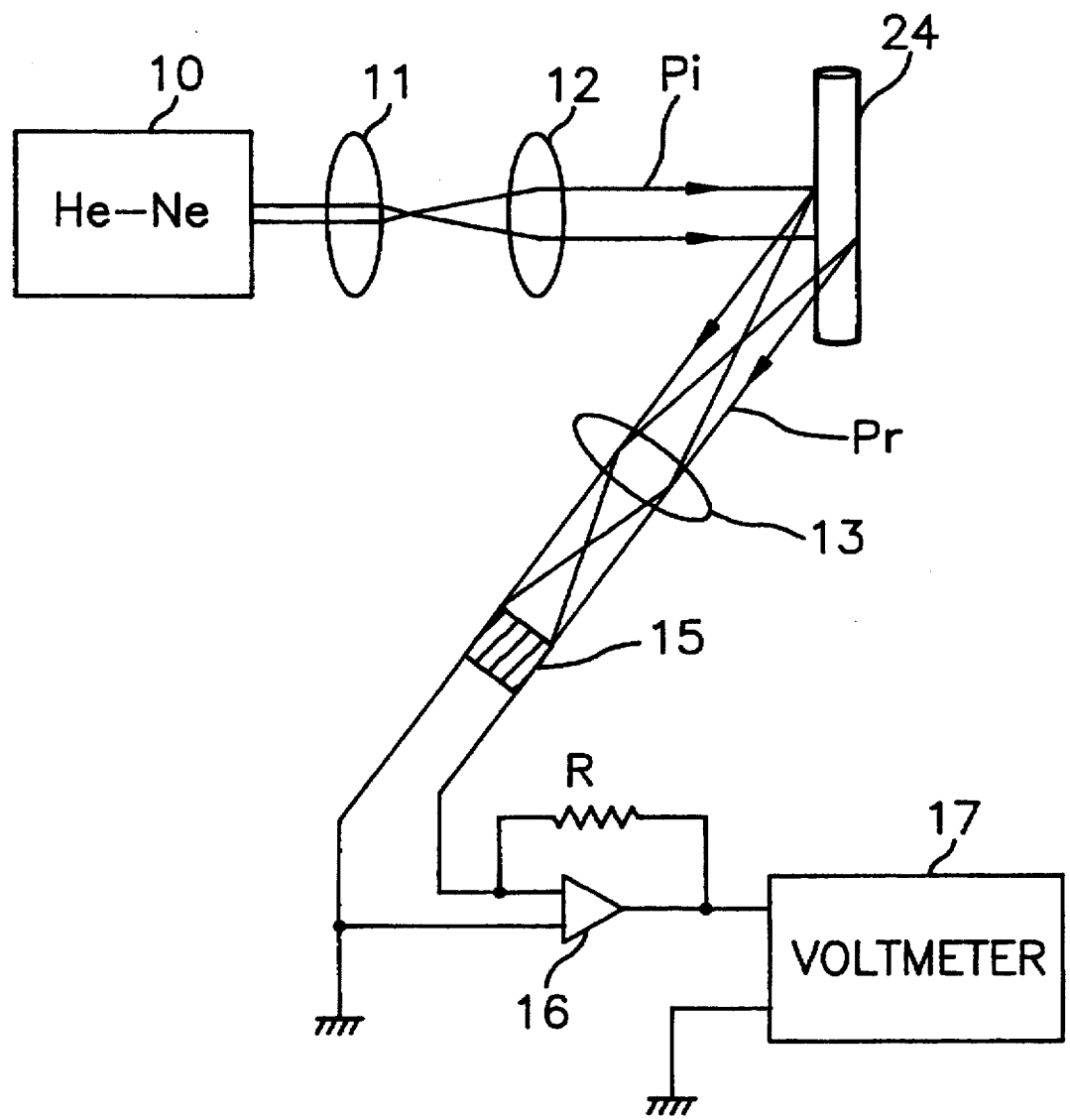
FIG. 1 provides a schematic diagram showing one of the prior art techniques for measuring the coating thickness.
Figure 2:
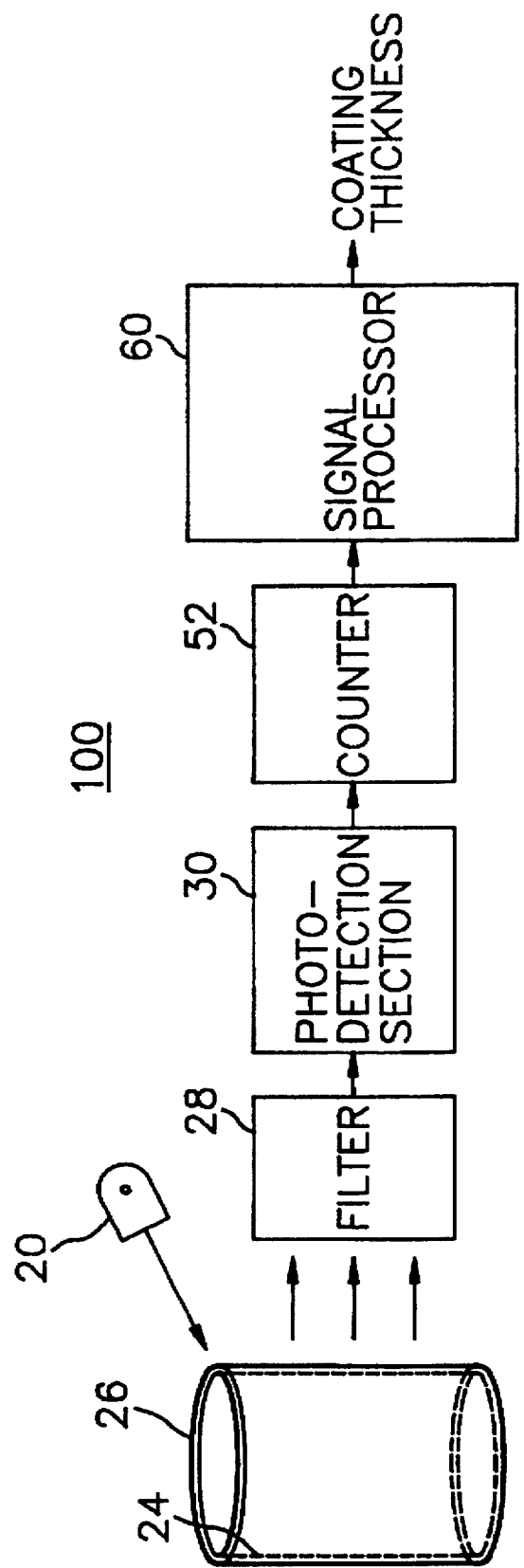
FIG. 2 depicts a schematic diagram of an apparatus for measuring the coating thickness in accordance with a preferred embodiment of the present invention.

Referring to FIG. 2, there is shown a schematic diagram of an apparatus 100 for measuring the thickness of a coating formed on a surface 24 of an article in accordance with a preferred embodiment of the present invention, wherein the coating formed thereon is made of a transparent material, e.g., a diamond like carbon(DLC), and is formed by using, e.g., a plasma enhanced chemical vapor deposition method. As used herein, by diamond-like-carbon, it is meant a three dimensional arrangement of carbon atoms having a short range order which is similar to the one observed in the diamond structure, wherein each carbon atom is surrounded by four other carbon atoms, but unlike the diamond structure lacks a long range order, i.e., no unit of the structure is repeated at regular intervals. The coating material formed on the surface 24 gives rise to a coating surface 26 which defines a boundary between the coating material and a coating environment. For the sake of simplifying the description of the inventive apparatus, the apparatus 100, shown in FIG. 2, comprises a white light source 20, a filter 28, a photo-detection section 30, a counter 52 and a signal processor 60.

Figure 3:
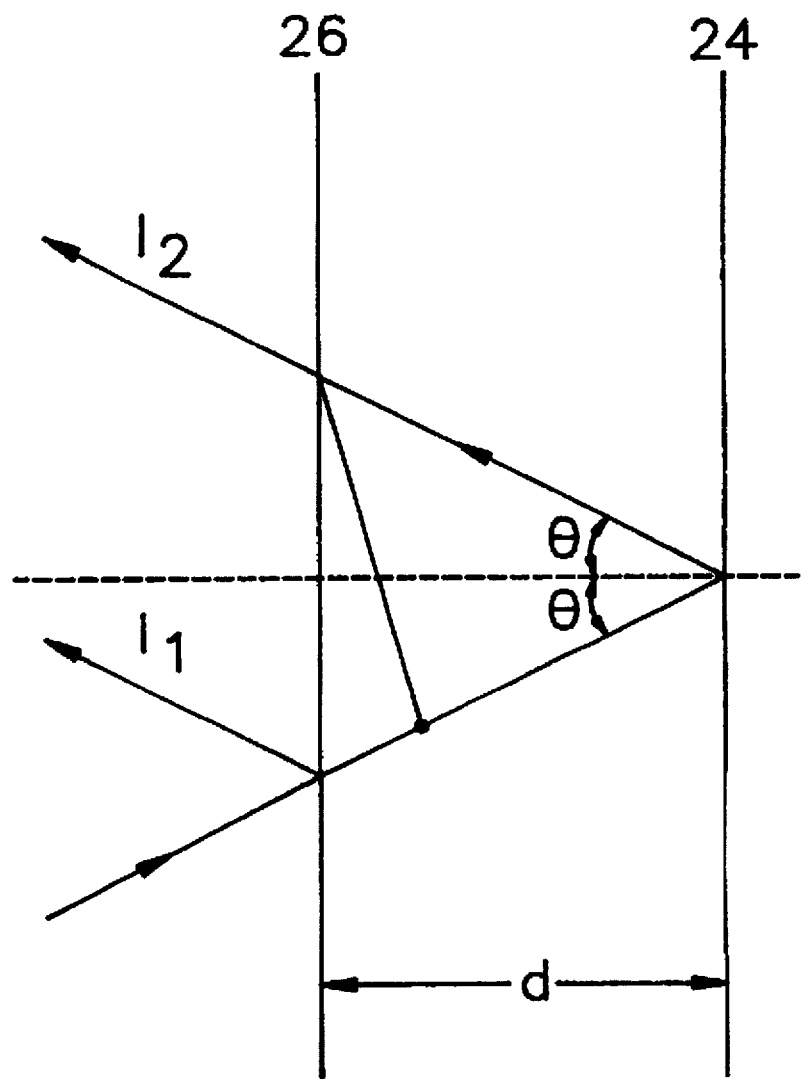
FIG. 3 shows a schematic view illustrating an optical path difference between a light beam reflected from the coating surface and a light beam reflected from the surface of the article.

As shown in FIG. 3, a light beam from the white light source 20 is partially reflected, generating a first reflected light beam, and partially transmitted at the coating surface 26. The transmitted part is subsequently reflected back to the coating surface 26 by the surface 24 of the article, generating a second reflected light beam. The first and the second reflected light beams are represented by the notations $I_1$ and $I_2$, respectively. The first and the second reflected light beams $I_1$, $I_2$ interfere with each other due to a phase difference therebetween to thereby produce an interfered reflected light beam.

Referring back to FIG. 2, the filter 28 filters the interfered reflected light beam in a selected wavelength range to thereby produce a filtered light beam having the selected wavelength range.

Referring back to FIG. 3, there is shown a schematic view illustrating an optical path difference between the first and the second reflected light beams. If d is the coating thickness, $\theta$ is an angle between the light beam reflected from the surface 24 and a surface normal thereto and $\lambda_0$ is the wavelength of the first and the second reflected light beams measured in a vacuum, the path difference between the first and the second reflected light beams becomes $2d\cos\theta$ and a corresponding phase difference $\delta$ therebetween is given by $$\delta = \frac{4\pi}{\lambda_0} nd\cos\theta \qquad \text{Eq. (1)}$$

wherein n is the index of refraction of the coating material. Referring Eq. (1), the coating thickness is $$d = \frac{\delta \lambda_0}{4\pi n \cos\theta} \qquad \text{Eq. (2)}$$

A constructive interference of the first and the second reflected light beams occurs whenever $\delta=(2N+1)\pi$, N being an integer, and under such a circumstance, intensity of the reflected light beams is at its maximum. The coating thickness at each point of constructive interference becomes $$d_N = \frac{(2N+1)\lambda_0}{4n\cos\theta} \qquad \text{Eq. (3)}$$

wherein $d_N$ represents the coating thickness at each value of N. The integer N is also known as the order of interference.

In the preferred embodiment of the present invention, the $\theta$ and the index of refraction of DLC approximately equal to 0° and 1.8–2.2, respectively. Accordingly, Eq. (3) can further be reduced to:

$$d_N \cong \frac{(2N+1)\lambda_0}{8} \qquad \text{Eq. (4)}$$

Referring back to FIG. 2, the filtered light beam from the filter 28 is fed to the photo-detection section 30. The photo-detection section 30, in turn, detects the intensity of the filtered light beam and generates a corresponding counting reference signal therefrom, the counting reference signal being eventually used for obtaining a count number used for determining the coating thickness.

Figure 4:
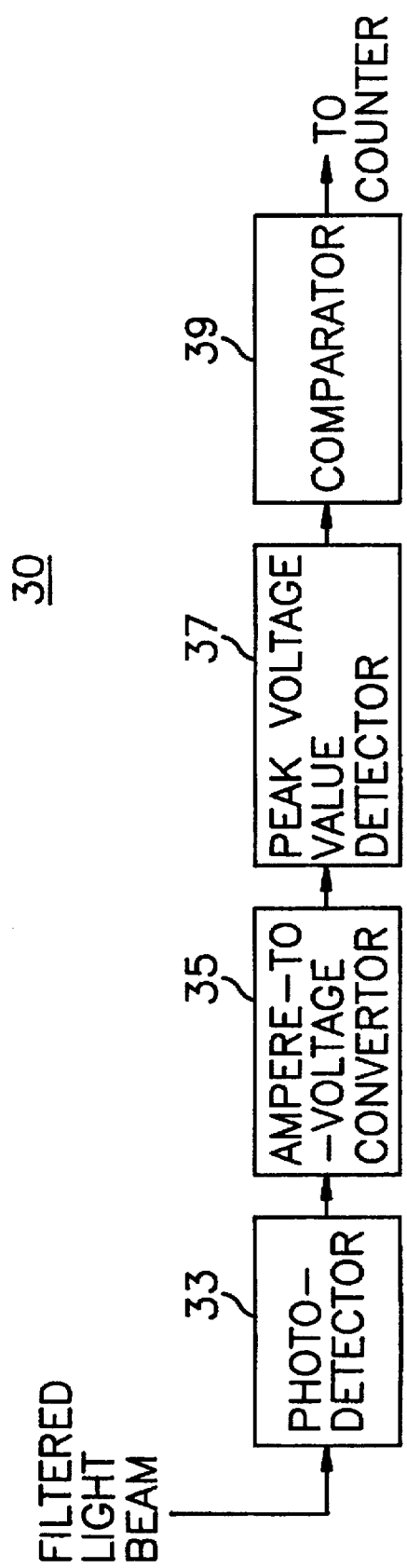
FIG. 4 presents a block diagram of the photo-detection section shown in FIG. 2.

In FIG. 4, there is illustrated a detailed block diagram of the photo-detection section 30 shown in FIG. 2. The photo-detection section 30 comprises a photo-detector 33, an ampere-to-voltage convertor 35, a peak voltage value detector 37 and a comparator 39. The photo-detector 33 detects the intensity of the filtered light beam from the filter 28 and converts the intensity into a corresponding current signal. The current signal exhibits a multiplicity of current peaks, each of the current peaks appearing whenever the reflected light beam from the coating surface 26 and the surface 24 interfere each other constructively in the selected wavelength range, i.e., whenever $\delta=(2N+1)\pi$, N being integers, is satisfied. The current signal from the photo-detector 33 is then applied to the ampere-to-voltage convertor 35 which converts the current signal into a corresponding voltage signal. Similarly, the voltage signal exhibits a multiplicity of voltage peaks, each of the voltage peaks corresponding to each of the current peaks. The peak voltage value detector 37 receives the voltage signal from the ampere-to-voltage convertor 35 and detects the peak voltage values in the voltage signal. At the comparator 39, the peak voltage values are compared with a predetermined threshold value, respectively, to thereby produce a counting reference signal including logic high and low states. When the peak voltage value exceeds the predetermined threshold value, the comparator 39 produces a logic high state in the counting reference signal, and in other cases, a logic low state.

Referring back to FIG. 2, the counter 52 receives the counting reference signal from the photo-detection section 30, and counts the number of logic high states in the counting reference signal to thereby produce a count number. The count number is then fed to the signal processor 60 which selects the coating thickness based on the count number M from a plurality of predetermined coating thickness calculated using Eq. (3) and, in case of the DLC coating, Eq. (4).

Table 1 shown below depicts the relationship between the coating thickness and the count number M, e.g., for a light beam having a selected wavelength range of 5800 Å–6000 Å, i.e., yellow color. If M is equal to 1, this is equivalent to observing the first constructive interference between the first and the second reflected light beams at the selected wavelength range of 5800 Å–6000 Å, i.e., observing the first peak in the current and the voltage signals, and the first logic high state in the counting reference signal. This will be observed, according to Table 1, when the coating thickness is about 700 Å–750 Å, and hence the DLC coating thickness is about 700 Å–750 Å. Similarly, if M is equal to 2, the signal processor 60 outputs the coating thickness as 2200 Å–2300 Å. Needless to mention is that, in order to utilize Table 1, the filter 28 shown in FIG. 2 must be able to pass only the light beam having the wavelength range of 5800 Å–6000 Å.

TABLE 1

| Count number | M = 1 | M = 2 | M = 3 | M = 4 | M = 5 |
| --- | --- | --- | --- | --- | --- |
| Yellow (5800-6000Å) | 700-750 | 2200-2300 | 3625-3750 | 5050-5250 | 6520-6750 |

Figure 5:
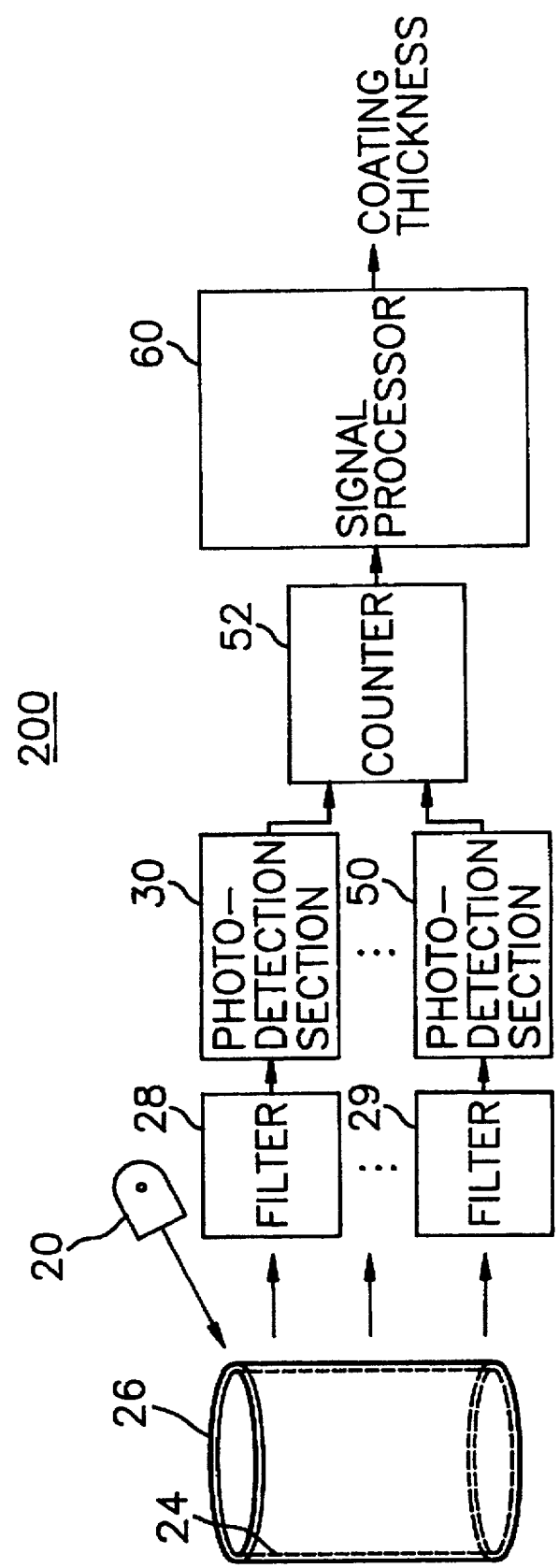
FIG. 5 offers a schematic diagram of an apparatus incorporating therein a multiplicity of filters and the corresponding number of photo-detection sections.

In order to improve the accuracy of the apparatus 100, additional filters and an identical number of photo-detection sections as filters can be added thereto, as shown in FIG. 5. The apparatus 200 shown in FIG. 5 incorporates therein additional filters, e.g., 29, and the corresponding number of photo-detection sections, e.g., 50. It should be noted that like parts appearing in FIGS. 2 and 5 are represented by like reference numerals. In this case, each of the filters, arranged in parallel, is capable of filtering the interfered reflected light beam in a selected wavelength range. The wavelength range each of the filters will filter can be selected in such a way that the voltage peaks, and hence the counting reference signal, for each of the filtered light beams do not overlap the same from other filtered light beams. Each of the filtered light beams is then fed into each of the photo-detection sections to thereby generate a multiplicity of counting reference signals, each of the counting reference signals corresponding to each of the filtered light beams. The counter 52 counts the number of logic high states in the counting reference signals from each of the photo-detection sections, respectively, and computes a sum of the count numbers, thereby generating a total count number T. The total count number T is then fed to the signal processor 60, and the signal processor 60 selects the corresponding coating thickness from Table 2 similar to Table 1 except that, instead of containing a more detailed data on the coating thickness and the total count number.

Table 2 shown below depicts the relationship between the coating thickness and the total count number T for an apparatus including, for example, three filters, each of the filters capable of filtering a selected wavelength range of 3800 Å–4000 Å, 4900 Å–5100 Å, 5800 Å–6000 Å, respectively. By selecting the coating thickness from Table 2, it is possible to obtain a more accurate coating thickness.

TABLE 2

| Total Count number | T = 1 | T = 2 | T = 3 | T = 4 | T = 5 |
| --- | --- | --- | --- | --- | --- |
| 3800–4000Å | 475–500 | — | — | 1425–1500 | — |
| 4900–5100Å | — | 612–637 | — | — | 1837–1912 |
| 5800–6000Å | — | — | 725–750 | — | — |

In comparison with the prior art measuring device, the inventive apparatus is of a simpler structure, requiring a smaller number of components and less expensive to manufacture. This is achieved by incorporating a white light source instead of a coherent and monochromatic light source, thereby eliminating a number of lenses in the prior art apparatus, reducing the total number of components making up the system, and also eliminating the need for a precise optical alignment.

While the present invention has been described with respect to the preferred embodiments, other modifications and variations may be made without departing from the scope of the present invention as set forth in the following claims.

What is claimed is:

1. An apparatus for measuring, in situ, a thickness of a transparent coating material coated on a surface of an article with a coating surface thereof, the apparatus comprising:

a white light source for emitting a light beam onto the surface of the article, wherein the light beam is partially reflected, generating a first reflected light beam, and partially transmitted at the coating surface of the transparent coating material, the transmitted part being subsequently reflected back to the coating surface by the surface of the article, generating a second reflected light beam, wherein the first and the second reflected light beams interfere with each other due to a phase difference therebetween to thereby produce an interfered reflected light beam;

one or more filters, each of the filters capable of filtering the interfered reflected light beam in a selected wavelength range to thereby produce a filtered light beam having the selected wavelength range;

an identical number of photo-detection sections as the filters arranged in parallel, each of the photo-detection sections capable of detecting an intensity of the filtered light beam from a corresponding filter and generating a counting reference signal therefrom, wherein each of the photo-detection sections includes:

a photo-detector for detecting the intensity of the filtered light beam from a corresponding filter and converting it into a corresponding current signal, wherein the current signal exhibits a multiplicity of current peaks;

an ampere-to-voltage convertor for converting the current signal from the photo-detector into a corresponding voltage signal, the voltage signal exhibiting a multiplicity of voltage peaks, each of the voltage peaks having an associated peak value and corresponding to each of the current peaks;

a peak voltage value detector for detecting the peak voltage values in the voltage signal from the ampere-to-voltage convertor; and a comparator for comparing the peak voltage values with a predetermined threshold value, respectively, to thereby produce the counting reference signal having logic high and low states;

a counter for counting the logic high states of the counting reference signal to thereby produce a count number; and a signal processor for selecting the coating thickness from a plurality of predetermined coating thicknesses based on the count number.

2. The apparatus as recited in claim 1, wherein the plurality of predetermined coating thicknesses is determined by:

$$d_N = \frac{(2N+1)\lambda_0}{4n\cos\theta}$$

wherein N, $\lambda_0$, n, $d_N$ and $\theta$ represent the order of interference, the wavelength of the light beam measured in a vacuum, a refraction index of the transparent coating material, the coating thickness at the Nth order interference and an angle between the second reflected light beam in the coating material and a surface normal thereto, respectively.

3. The apparatus as recited in claim 1, wherein each of the photo-detection sections includes:

a photo-detector for detecting the intensity of the filtered light beam from a corresponding filter and converting it into a corresponding current signal, wherein the current signal exhibits a multiplicity of current peaks;

an ampere-to-voltage convertor for converting the current signal from the photo-detector into a corresponding voltage signal, the voltage signal exhibiting a multiplicity of voltage peaks, each of the voltage peaks having an associated peak value and corresponding to each of the current peaks;

a peak voltage value detector for detecting the peak voltage values in the voltage signal from the ampere-to-voltage convertor; and a comparator for comparing the peak voltage values with a predetermined threshold value, respectively, to thereby produce the counting reference signal.

4. The apparatus as recited in claim 1, wherein the plurality of predetermined coating thicknesses is determined by:

wherein N, $\lambda_0$, n, $d_N$ and $\theta$ represent the order of interference, the wavelength of $$d_N = \frac{(2N+1)\lambda_0}{4n\cos\theta}$$

the light beam measured in a vacuum, the refraction index of the transparent coating material, the coating thickness at the Nth order interference and the angle between the second reflected light beam in the coating material and a surface normal thereto, respectively.

5. An apparatus for automatically measuring, in situ, a thickness of a transparent coating material coated on a surface of an article, the apparatus comprising:

a white light source for emitting a light beam onto the surface of the article, wherein the light beam is partially reflected, generating a first reflected light beam, and partially transmitted at a coating surface of the transparent coating material, the transmitted part being subsequently reflected back to the coating surface by the surface of the article, generating a second reflected light beam, wherein the first and the second reflected light beams interfere with each other due to a phase difference therebetween to thereby produce an interfered reflected light beam;

one or more filters, each of the filters capable of filtering the interfered reflected light beam in a selected wavelength range to thereby produce a filtered light beam having the selected wavelength range;

a same number of photo-detection sections as the number of the filters arranged in parallel, each of the photo-detection sections capable of detecting an intensity of the filtered light beam from a corresponding filter and generating a counting reference signal, the amplitude of the counting reference signal varying in response to the intensity, wherein the counting reference signal includes logic high and low states;

a counter for counting the logic high states of the counting reference signal to thereby produce a count number; and a signal processor for selecting the coating thickness from a plurality of predetermined coating thicknesses based on the count number.

6. An apparatus for automatically measuring a thickness of a transparent coating material coated on a surface of an article, the apparatus comprising:

a white light source for emitting a light beam onto the surface of the article, wherein the light beam is partially reflected, generating a first reflected light beam, and partially transmitted at a coating surface of the transparent coating material, the transmitted part being subsequently reflected back to the coating surface by the surface of the article, generating a second reflected light beam, wherein the first and the second reflected light beams interfere with each other due to a phase difference therebetween to thereby produce an interfered reflected light beam;

at least one filter, said filter arranged to filter the interfered reflected light beam in a selected wavelength range and provide a filtered light beam;

a photo-detector corresponding to each filter, said photo-detector arranged to detect an intensity of the filtered light beam from its corresponding filter and output a signal reflective of said intensity;

a counter arranged to output a count number reflective of the number of times that a value of said signal exceeds a predetermined threshold;

a look-up table comprising a plurality of thickness ranges indexed by said count number; and a signal processor arranged to select one from among said thickness entries in response to said count number.

7. The apparatus of claim 6, comprising a plurality of filters, each arranged to filter at a different wavelength and each associated with a corresponding photodetector, wherein the counter is arranged to compute a count number for each photodetector and then output a total count number corresponding to a sum of the count numbers;

the look-up table comprises thickness ranges indexed by said total count number; and the signal processor is arranged to select one from among said thickness entries in response to said total count number.

8. The apparatus of claim 7, wherein said plurality of filters are arranged to filter in disjoint wavelength ranges.

* * * * *